United States Patent
Tani et al.

(10) Patent No.: US 9,731,763 B2
(45) Date of Patent: Aug. 15, 2017

(54) PARKING ASSIST DEVICE AND PARKING ASSIST SYSTEM

(71) Applicant: FUJITSU TEN LIMITED, Kobe-shi, Hyogo (JP)

(72) Inventors: Yasushi Tani, Kobe (JP); Tetsuya Otoshi, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 0 days.

(21) Appl. No.: 15/058,482

(22) Filed: Mar. 2, 2016

(65) Prior Publication Data
US 2016/0288832 A1 Oct. 6, 2016

(30) Foreign Application Priority Data

Mar. 31, 2015 (JP) ................................. 2015-071888

(51) Int. Cl.
*B62D 15/02* (2006.01)
(52) U.S. Cl.
CPC .................. *B62D 15/028* (2013.01)
(58) Field of Classification Search
CPC ................................................ B62D 15/0275
USPC ........................................................... 701/36
See application file for complete search history.

(56) References Cited

U.S. PATENT DOCUMENTS

| | | | |
|---|---|---|---|
| 2015/0179075 A1* | 6/2015 | Lee .................. | G08G 1/165 340/932.2 |
| 2016/0159397 A1* | 6/2016 | Baek .................... | B60W 30/06 701/41 |
| 2016/0288832 A1* | 10/2016 | Tani et al. ......... | B62D 15/0275 |

FOREIGN PATENT DOCUMENTS

| JP | 2001-229498 A | 8/2001 |
|---|---|---|
| JP | 2012-001144 A | 1/2012 |

\* cited by examiner

*Primary Examiner* — McDieunel Marc
*Assistant Examiner* — James E Stroud
(74) *Attorney, Agent, or Firm* — Oliff PLC

(57) ABSTRACT

A parking assist device for assisting parking of a vehicle, includes: a detecting unit that detects whether there is any obstacle and detects available parking areas for the vehicle, on the basis of a taken image of the surrounding area of the vehicle; and a selecting unit that selects an available parking area where the vehicle is parked with low risk of contact with the obstacle, from the detected available parking areas, on the basis of whether there is the obstacle.

12 Claims, 16 Drawing Sheets

| PASSENGER | | | | AVAILABLE PARKING AREA | |
|---|---|---|---|---|---|
| DRIVER'S SEAT | FRONT PASSENGER SEAT | REAR RIGHT SEAT | REAR LEFT SEAT | LEFT | RIGHT |
| ○ | ○ | ○ | ○ | — | ※ |
| ○ | ○ | ○ | — | ※ | — |
| ○ | — | ○ | ○ | ※ | — |
| ○ | ○ | — | ○ | — | ※ |
| ○ | ○ | — | — | — | ※ |
| ○ | — | ○ | — | ※ | — |
| ○ | — | — | ○ | — | ※ |
| ○ | — | — | — | ※ | — |

FIG. 13

| SURROUNDING CONDITION | EVALUATION VALUE |
|---|---|
| THERE IS NO OBSTACLE ON BOTH SIDES | 1 |
| THERE IS OBSTACLE ON RIGHT SIDE | 2 |
| THERE IS OBSTACLE ON LEFT SIDE | 3 |
| THERE ARE OBSTACLES ON BOTH SIDES | 4 |
| THERE IS OBSTACLE ON FRONT SIDE | 2 |
| THERE IS OBSTACLE ON RARE SIDE | 2 |
| LONG DISTANCE | 1 |
| MEDIUM DISTANCE | 2 |
| SHORT DISTANCE | 3 |

FIG. 17

| SURROUNDING CONDITION | EVALUATION VALUE | |
|---|---|---|
| | THERE IS PASSENGER IN FRONT PASSENGER SEAT | THERE IS NO PASSENGER IN FRONT PASSENGER SEAT |
| THERE IS NO OBSTACLE ON BOTH SIDES | 1 | 1 |
| THERE IS OBSTACLE ON RIGHT SIDE | 2 | 3 |
| THERE IS OBSTACLE ON LEFT SIDE | 3 | 2 |
| THERE ARE OBSTACLES ON BOTH SIDES | 4 | 4 |
| THERE IS OBSTACLE ON FRONT SIDE | 2 | 2 |
| THERE IS OBSTACLE ON RARE SIDE | 2 | 2 |
| LONG DISTANCE | 1 | 1 |
| MEDIUM DISTANCE | 2 | 2 |
| SHORT DISTANCE | 3 | 3 |

PARKING ASSIST DEVICE AND PARKING ASSIST SYSTEM

CROSS-REFERENCE TO RELATED APPLICATIONS

This application is based on and claims priority under 35 USC 119 from Japanese Patent Application No. 2015-071888 filed on Mar. 31, 2015, the entire content of which is incorporated herein by reference.

BACKGROUND

1. Technical Field

The present invention relates to a technology for assisting parking of a vehicle.

2. Related Art

In the related art, there is proposed a technology for offering available parking areas for a vehicle to the driver of the vehicle. In this technology, for example, the surrounding areas of the vehicle are taken by cameras, and parking spaces are detected on the basis of the taken images. Then, the detected parking spaces are displayed on a screen, whereby available parking areas are offered. The driver can select a parking area from the offered available parking areas, and park the vehicle in the selected parking area. Also, as a technology related to the present invention, there is JP-A-2012-1144 for instance.

SUMMARY OF INVENTION

However, according to the technology for merely offering available parking areas, in a case where there is a plurality of available parking areas, for example, inexperienced drivers and elderly drivers often select parking areas regardless of "ease of parking" and so on. In this case, people whose driving skill levels are not very high consequently select parking areas having high degrees of parking difficulty.

In view of above, at least one embodiment of the present invention provides a technology capable of selecting an area where the possibility of contact with obstacles during parking or when passengers get out of the vehicle is low and it is possible to more safely park the vehicle.

[1] At least one embodiment of the present invention provides a parking assist device for assisting parking of a vehicle, including: a detecting unit that detects whether there is any obstacle and detects a plurality of available parking areas for the vehicle, on the basis of a taken image of the surrounding area of the vehicle; and a selecting unit that selects an available parking area where the vehicle is parked with low risk of contact with the obstacle, from the detected available parking areas, on the basis of whether there is the obstacle.

[2] It may be the parking assist device according to [1], in which: in a case where three or more consecutive parking areas are detected as available parking areas, the selecting unit selects an available parking area other than outermost areas.

[3] It may be the parking assist device according to [1], in which: in a case where two consecutive parking areas are detected as available parking areas, the selecting unit selects an available parking area according to the distances between the detected available parking areas and the obstacle.

[4] It may be the parking assist device according to [3], in which: the selecting unit selects an available parking area having a longer distance from the obstacle, from the detected two available parking areas.

[5] It may be the parking assist device according to [1], in which: in a case where two consecutive parking areas are detected as available parking areas, the selecting unit selects an available parking area according to the passenger location condition of the vehicle.

[6] It may be the parking assist device according to any one of [1] to [5], in which: the selecting unit selects an available parking area according to whether there is any obstacle in an area positioned on the front side of each of the detected available parking areas.

[7] It may be the parking assist device according to [1], in which: for evaluation items which are surrounding conditions of the vehicle, evaluation values representing degrees of parking appropriateness are set in advance, and the selecting unit derives the degree of parking appropriateness on the basis of evaluation values associated with evaluation items corresponding to each of the available parking areas, and selects an available parking area where the vehicle is parked with low risk of contact with the obstacle, on the basis of the degrees of parking appropriateness.

[8] It may be the parking assist device according to [1], in which: for evaluation items which are obstacle conditions, evaluation values representing the degrees of parking appropriateness are set in advance, and the selecting unit derives the degree of parking appropriateness on the basis of evaluation values associated with evaluation items corresponding to each of the available parking areas, and selects an available parking area appropriate for parking the vehicle, on the basis of the degrees of parking appropriateness.

[9] It may be the parking assist device according to [7] or [8], in which: the evaluation values are set depending on the passenger location condition of the vehicle.

[10] It may be the parking assist device according to any one of [1] to [9], further including: a route deriving unit that derives movement routes to the detected available parking areas; and a display control unit that displays and superimposes the derived movement routes on the taken image.

[11] It may be the parking assist device according to [10], in which: the display control unit displays and superimposes a movement route to an available parking area for parking the vehicle on the taken image, and does not display and superimpose movement routes to the other available parking areas.

[12] At least one embodiment of the present invention provides a parking assist system for assisting parking of a vehicle, including: an imaging device that images the surrounding area of the vehicle; and the parking assist device according to any one of [1] to [11].

According to the at least one embodiment of the present invention, since an available parking area appropriate for parking the vehicle is selected on the basis of where there is any obstacle, it becomes possible to offer an available parking area where the possibility of contact with obstacles during parking or when passengers get out of the vehicle is low and it is possible to more safely park the vehicle.

BRIEF DESCRIPTION OF DRAWINGS

FIG. 13 is a view illustrating the relation between surrounding conditions and evaluation values.

FIG. 17 is a view illustrating the relation between surrounding conditions and evaluation values.

DESCRIPTION OF EMBODIMENTS

Hereinafter, embodiments of the present invention will be described with reference to the accompanying drawings.

1. First Embodiment

<1-1. Configuration of Parking Assist System>

A parking assist system according to the present embodiment is a system for offering available parking areas where it is possible to more safely park a vehicle, to the driver of the vehicle, in a case of parking the vehicle an available parking area which is a vehicle parking space. Especially, the parking assist system of the present embodiment is a system which is usable in a case of parking a vehicle in a parking lot, and detects available parking areas on the basis of images taken by cameras mounted on the vehicle, and selects an available parking area where it is possible to more safely park the vehicle, in view of whether there is any obstacle around each available parking area. Hereinafter, the configuration of the parking assist system will be described.

Figure 1:
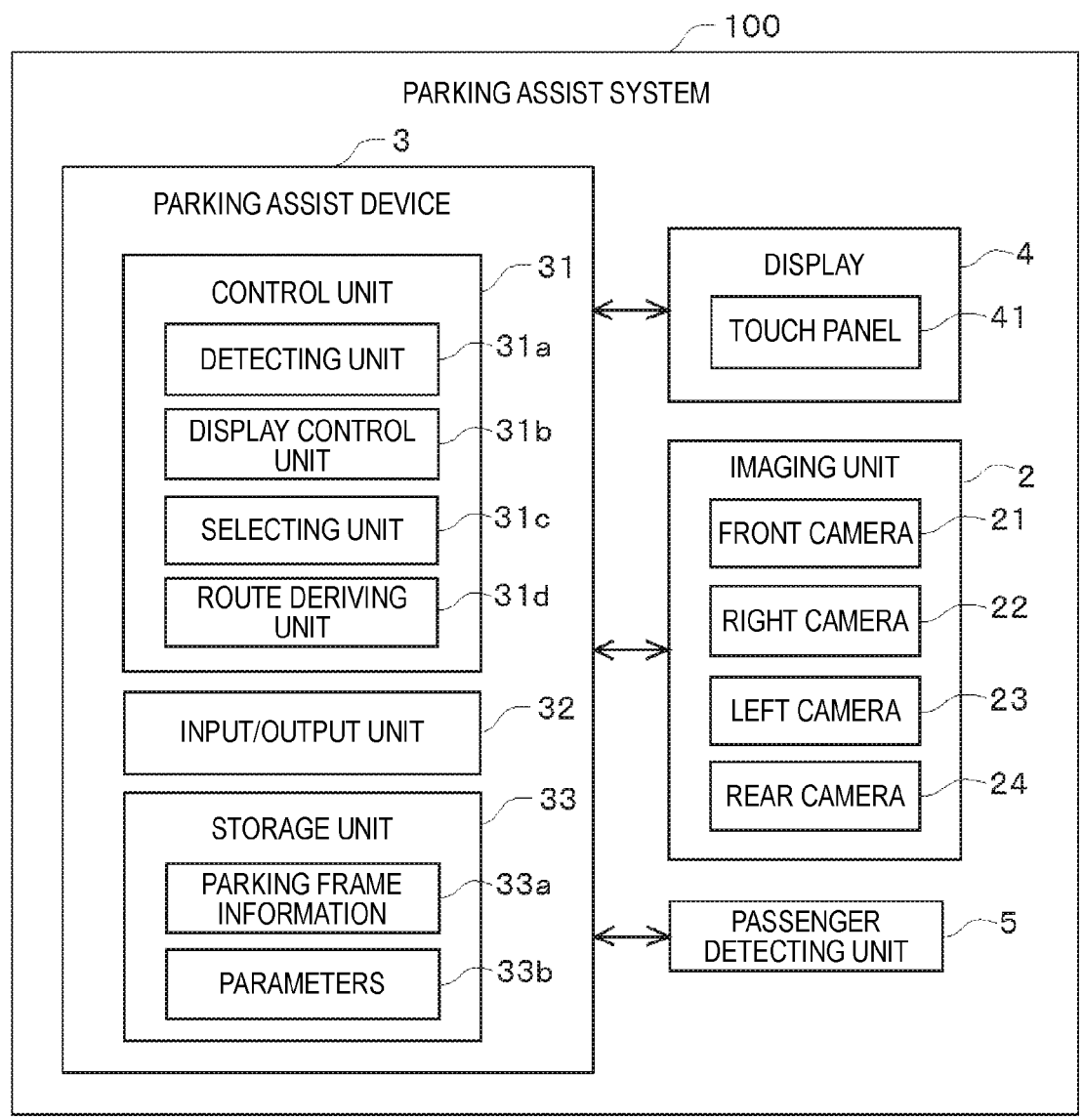
FIG. 1 is a view illustrating the outline of a parking assist system.

FIG. 1 is a block diagram illustrating the configuration of a parking assist system 100. As shown in FIG. 1, the parking assist system 100 includes an imaging unit 2, a parking assist device 3, a display 4, and a passenger detecting unit 5.

The imaging unit 2 includes a front camera 21, a right camera 22, a left camera 23, and a rear camera 24, as imaging devices, and images the outside of a vehicle. Each of the cameras 21 to 24 has a wide-angle lens, and performs digital imaging with an angle of view of 180 degrees or more, and transmits data on the taken image to the parking assist device 3. The cameras are installed on the front, rear, left, and right of a vehicle, whereby the imaging unit 2 can take the surrounding areas of the vehicle. Even if the cameras 21 to 24 take distorted images due to the distortion aberrations of their wide-angle lenses, it is possible to correct the distorted images to planar images by an image correction process.

The front camera 21 is disposed at the leading end portion of the vehicle, and images the front side of the vehicle. The front camera 21 is installed on the so-called front grille of the vehicle, but may be installed on the back of the rearview mirror positioned in the vehicle so as to image the front side of the vehicle through the front glass. The right camera 22 is installed in the case of the right wing mirror of the vehicle, and images the right side of the vehicle. The left camera 23 is installed in the case of the left wing mirror of the vehicle, and images the left side of the vehicle. The rear camera 24 is installed on the rear portion of the vehicle, and images the rear side of the vehicle. The rear camera 24 is installed in the vicinity of the rear-gate opening lever, but may be installed below the rear spoiler. In this case, since the imaging viewpoint becomes high, it is possible to image the rear side of the vehicle over a longer distance.

Although the parking assist system 100 of the present embodiment has four cameras, the present invention is not limited thereto. The parking assist system may have one or more cameras. For example, the parking assist system may be configured so as to have the rear camera 24 and perform each process of the present invention such as available parking area detection on the basis of a taken image by the rear camera 24.

The parking assist device 3 is an electronic control device which detects available parking areas for the vehicle, and selects an available parking area appropriate for parking the vehicle, from the detected available parking areas. The parking assist device 3 includes a control unit 31, an input/output unit 32, and a storage unit 33.

The control unit 31 is a computer having a CPU, a RAM, and a ROM (not shown). The control unit 31 is connected to the input/output unit 32 and the storage unit 33 included in the parking assist device 3, and performs data communication with them, thereby controlling the whole of the parking assist device 3. Also, the control unit 31 includes a detecting unit 31*a*, a display control unit 31*b*, a selecting unit 31*c*, and a route deriving unit 31*d*. These units included in the control unit 31 are functions which the CPU can implement by performing arithmetic processing according to programs.

The detecting unit 31*a* performs a process of detecting parking frames reflected in images of the outside of the vehicle taken by the imaging unit 2 and detecting parking areas and available parking areas. The term "parking frame" means a frame line defining a vehicle parking space. Also, the term "parking area" means a vehicle parking space surrounded by a parking frame, and the term "available parking area" means a parking area where there is no obstacle such as another vehicle and it is possible to park the vehicle.

The detecting unit 31*a* detects parking frames by use of each image taken by one or more cameras of the cameras 21 to 24. Specifically, the detecting unit detects parking frames on the basis of luminance changes in each taken image. This detecting process may be performed with respect to a predetermined area of each image. The term "predetermined area" means, for example, an area of an image corresponding to roadway surface. If the detecting process is performed on the whole of each image, the processing load becomes huge. However, if the detecting process is performed only on a predetermined area, it is possible to reduce the processing load.

Also, the detecting unit 31*a* detects parking areas on the basis of the detected parking frames. Specifically, the detecting unit 31*a* detects areas surrounded by the parking frames, as parking areas. For example, the size of a general parking frame is stored in the storage unit 33, and is compared with the sizes of the areas surrounded by the detected parking frames, whereby parking areas are detected.

Subsequently, the detecting unit 31*a* detects available parking areas. In parking areas where other vehicles have been already parked or there are any objects, it is impossible to park the vehicle. Therefore, the detecting unit 31*a* detects whether there is any obstacle, and detects available parking areas on the basis of the parking areas and the results of obstacle detection on the individual parking areas. In short, the detecting unit 31*a* performs the obstacle detecting process while detecting available parking areas. In this case, the detecting unit 31*a* detects parking areas where there is no obstacle, as available parking areas. Also, obstacle detection can be performed on the basis of each image taken by the imaging unit 2. Alternatively, other devices for obstacle detection, such as sensors or radar devices, may be separately provided and detect obstacles.

Also, if parking areas and obstacles are detected, the detecting unit 31*a* derives distances between the obstacles and parking areas adjacent to the obstacles, on the basis of the coordinate values of the parking areas and the obstacles. For example, in a case where an obstacle is another vehicle, since a distance between the corresponding vehicle and a parking area adjacent to the corresponding vehicle is derived, it is possible to detect the degree of closeness representing how much the corresponding vehicle is close to the adjacent parking area.

The display control unit 31*b* generates a display image to be displayed on the display 4, and performs display control. The display control unit 31*b* receives and saves information on the images taken by the imaging unit 2, as a still image or a video file, and converts the image information into data format displayable on the display 4, thereby generating a display image, and outputs the display image to the display 4 through the input/output unit 32. For example, the display control unit 31*b* performs control such that an image of the rear side of the vehicle taken by the rear camera 24 and including parking areas is displayed on the display 4.

The selecting unit 31*c* selects an available parking area where it is possible to more safely park the vehicle, from all available parking areas detected by the detecting unit 31*a*, on the basis of the surrounding conditions of the individual available parking areas (for example, the results of obstacle detection on adjacent parking areas). This process of selecting an available parking area will be described in detail.

The route deriving unit 31*d* derives routes for parking the vehicle in the available parking areas. Specifically, the route deriving unit 31*d* derives movement routes for parking the vehicle in the available parking areas, on the basis of the location of the vehicle, the locations of the available parking areas, the rudder angle of a steering, and the like. Also, the movement routes derived by the route deriving unit 31*d* are displayed on the display 4 by control of the display control unit 31*b*.

The input/output unit 32 controls input/output data related to the parking assist device 3. For example, the input/output unit 32 receives a signal for requesting start of parking assist control when parking of the vehicle starts. Also, the input/output unit 32 outputs a display control image generated by the display control unit 31*b*, to the display 4, in response to an output request from the control unit 31. Further, the input/output unit 32 acquires image data transmitted from the cameras 21 to 24 of the imaging unit 2, and so on.

The storage unit 33 retains parking frame information 33*a* and parameters 33*b*. As the storage unit 33, a non-volatile semiconductor memory which is electrically rewritable and can retain data even if power is shut off can be used. For example, the storage unit 33 may be configured by an electrically erasable programmable read-only memory (EEPROM) and a flash memory. Also, the storage unit 33 can be configured by a hard disk drive having a magnetic disk.

The parking frame information 33*a* includes information on coordinate values and the like representing the parking frames, the parking areas, and the available parking areas detected, and information on coordinate values and the like related to the degrees of closeness of the obstacles. Also, the parameters 33*b* are various parameters usable in the detecting process, and are, for example, a predetermined value usable in edge detection during frame line detection, a predetermined value usable to determine whether an area surrounded by a parking frame is a parking area, and the like.

The display 4 is a display device which has a touch panel 41 and displays images and so on. For example, the display 4 is a liquid crystal display.

The touch panel 41 senses a touch of a user's finger on an area showing a button displayed on the display 4, and outputs information on the sensed position on the touch panel 41 to the input/output unit 32. From the information on the position on the display 4 sensed by the touch panel 41, and information on the display image generated by the display control unit 31*b*, the control unit 31 can recognize the content of the user's operation. For example, in a case where the user selects any one on a vehicle seat position selection screen displayed on the display 4, information corresponding to the selected seat is transmitted to the input/output unit 32.

The passenger detecting unit 5 detects the seat positions of passengers in the vehicle. In other words, the passenger detecting unit detects which seats the passengers are sitting in. Specifically, a method of providing sensors below individual seats such that the sensors reacts if passengers sit, thereby sensing seats which passengers are sitting in, a method of providing a camera in the vehicle and sensing which seats passengers are sitting in, on the basis of a camera image, and various other methods can be used. Alternatively, the user may register which seats passengers are sitting in, in advance, by operating the touch panel 41.

<1-2. Process of Selecting Available Parking Area>

Now, a process of the selecting unit 31*c* of the parking assist device 3 for selecting an available parking area to be offered to the driver will be described. This selecting process is a process of selecting an available parking area where it is possible to more safely park the vehicle (the risk of contact with other vehicles and the like is low), according to the detected obstacle conditions of the surrounding areas of the individual available parking areas. In the present embodiment, there are first to third selecting processes depending on the surrounding obstacle conditions. These processes will be described in order.

Figure 2:
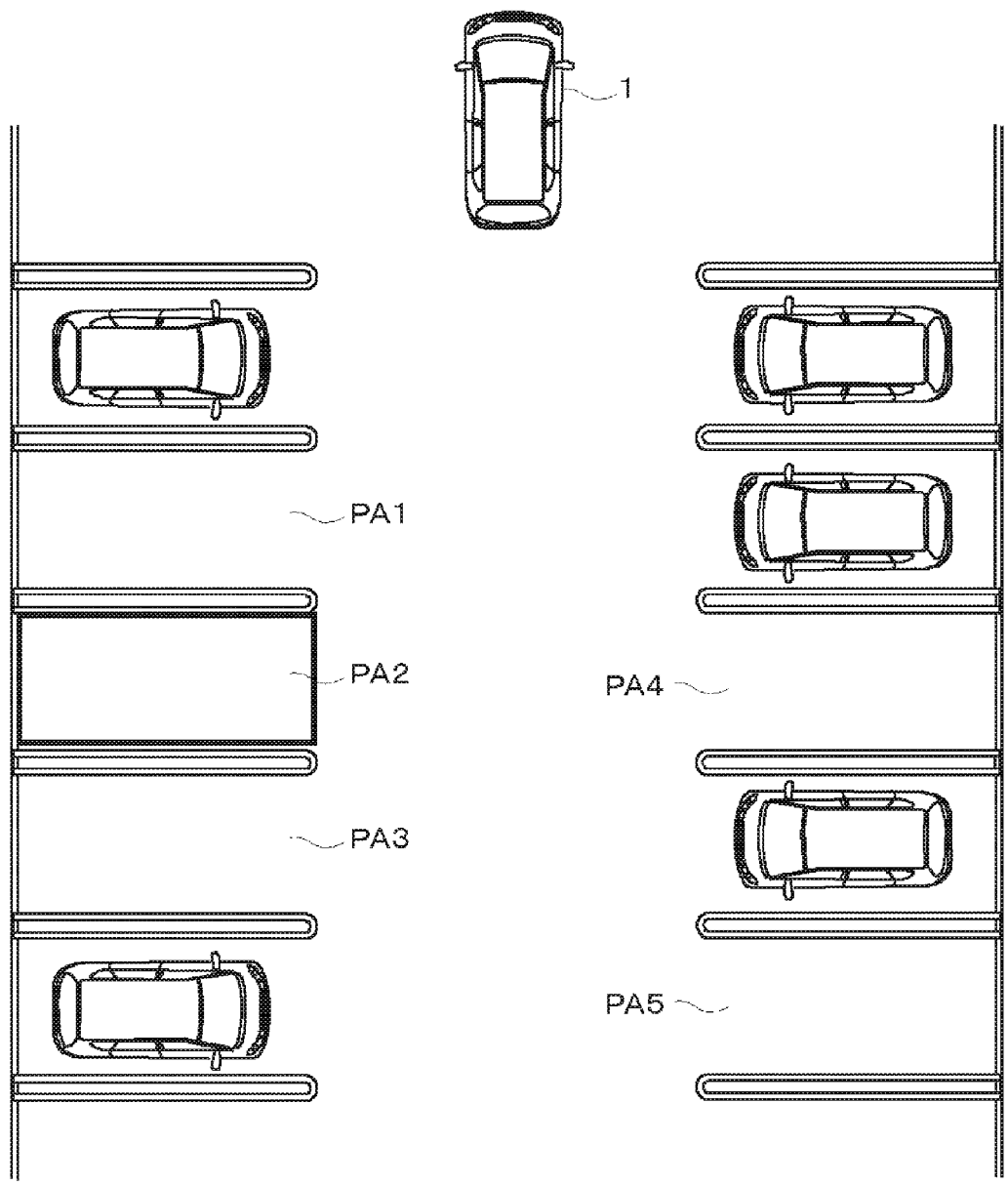
FIG. 2 is a bird's-eye view of the surrounding area of a vehicle.
Figure 3:
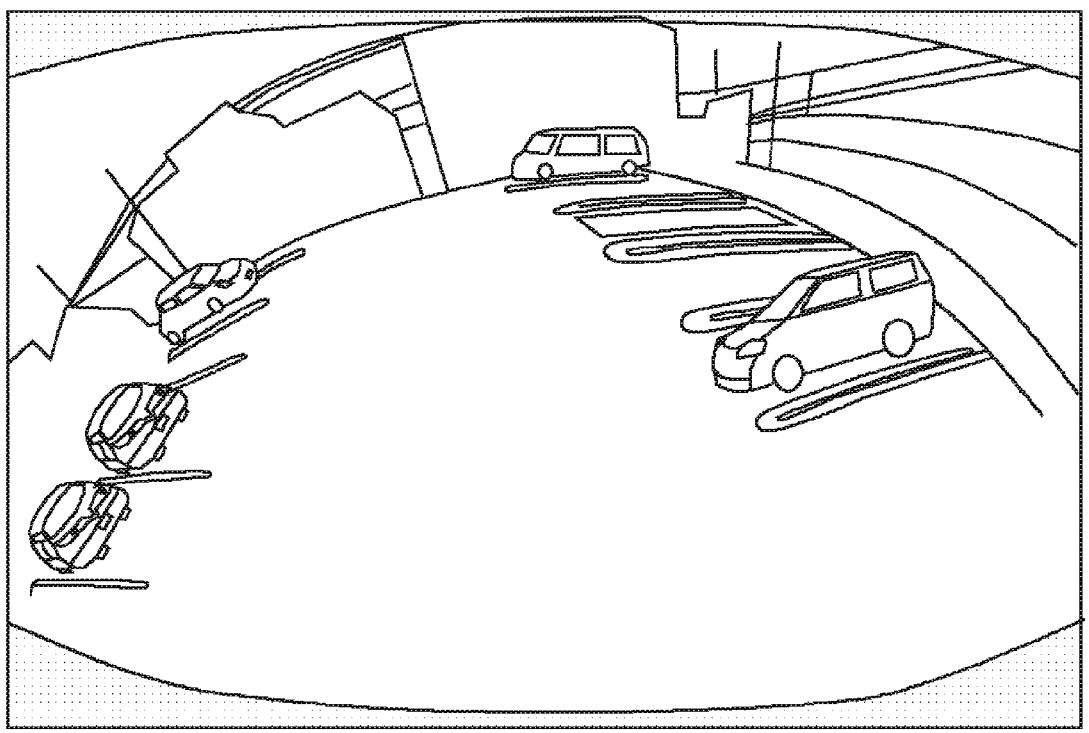
FIG. 3 is a view illustrating an image of the rear side of the vehicle.

First, the first selecting process will be described. FIGS. 2 and 3 are views for explaining the first selecting process. FIG. 2 is a view for facilitating understanding of the first selecting process and is a bird's-eye view illustrating the surrounding area of a vehicle 1. Also, FIG. 3 is a view illustrating an image taken by the rear camera 24 and displayed on the display 4.

The first selecting process is a process of selecting an available parking area having left and right adjacent parking areas where there is no obstacle such as other vehicles. In other words, the first selecting process is a process of selecting an available parking area other than the outermost areas in a case where there are three or more consecutive areas as available parking areas. Hereinafter, the first selecting process will be described specifically.

On the basis of information on the coordinate values and the like of available parking areas detected by the detecting unit 31*a*, the parking assist device 3 determines the locations of the available parking areas. In a case where there are three or more consecutive available parking areas, the parking assist device selects an available parking area other than the outermost available parking areas. In the example of FIG. 2, first, if the driver tries to back the vehicle 1 for parking the vehicle in a parking lot, the detecting unit 31a detects five available parking areas PA1 to PA5 existing on the rear side of the vehicle 1.

Then, on the basis of the locations of the detected individual available parking areas PA1 to PA5, the selecting unit 31c determines whether there are three or more consecutive available parking areas in line. In the example of FIG. 2, there are three consecutive available parking areas PA1 to PA3. Therefore, the selecting unit 31c selects the available parking area PA2 other than the outermost areas (that is, the center area), as an available parking area where it is possible to more safely park the vehicle.

Also, even in a case where there are four consecutive available parking areas, the selecting unit needs only to select an available parking area other than the outermost available parking areas. In other words, the selecting unit needs only to select an available parking area having left and right adjacent areas which are available parking areas (an available parking area interposed between available parking areas).

Thereafter, it is possible to display a boxed frame line on the corresponding area on the image taken as shown in FIG. 3 by the rear camera 24, thereby offering the selected available parking area to the driver.

As described above, an available parking area adjacent to areas where there is no obstacle is selected and is offered to the driver. Therefore, it is possible to park the vehicle 1 in a safer available parking area where the risk of contact with obstacles such as other vehicles during parking or when passengers get out of the vehicle is low.

Figure 4:
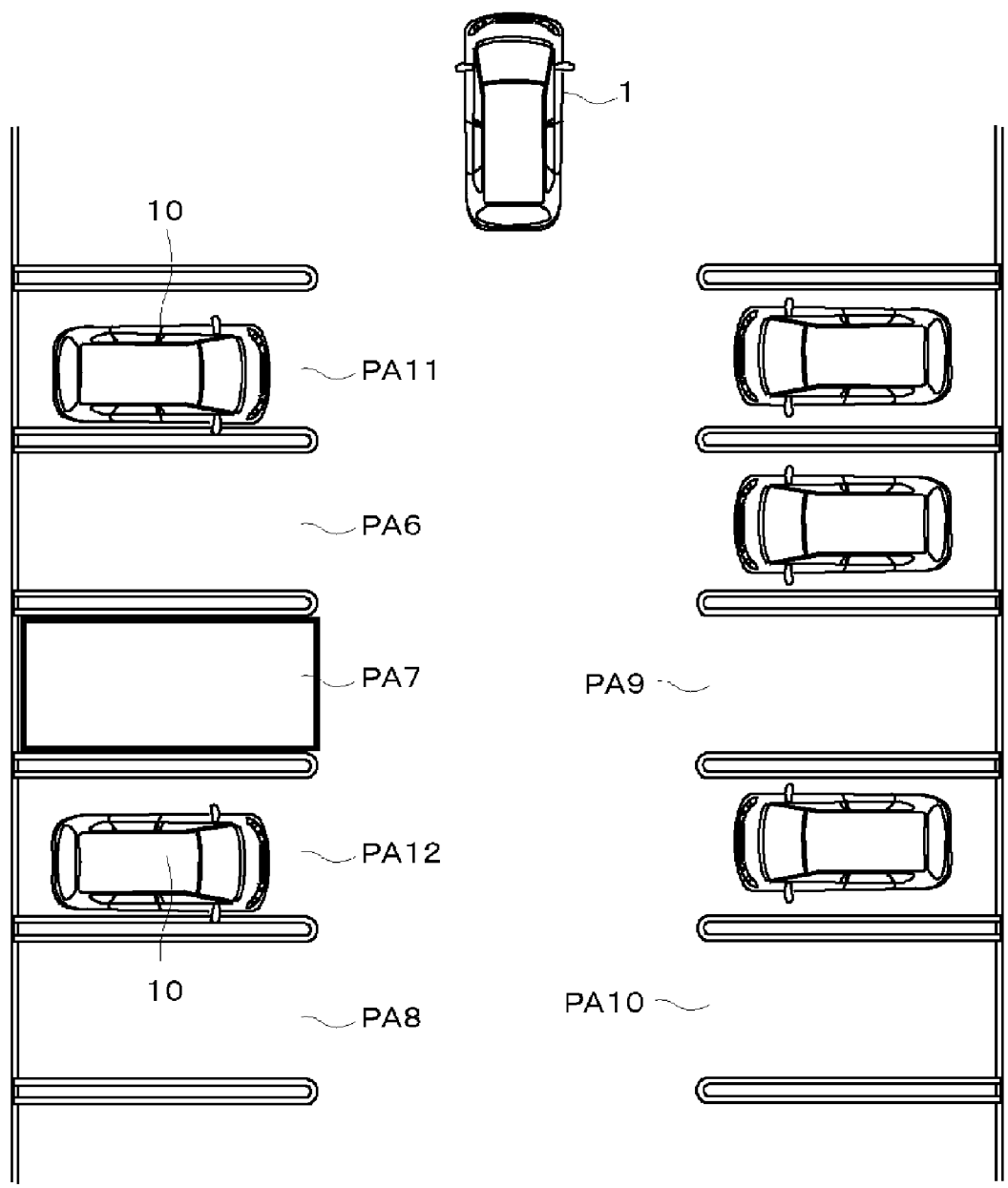
FIG. 4 is a bird's-eye view of the surroundings of the vehicle.
Figure 5:
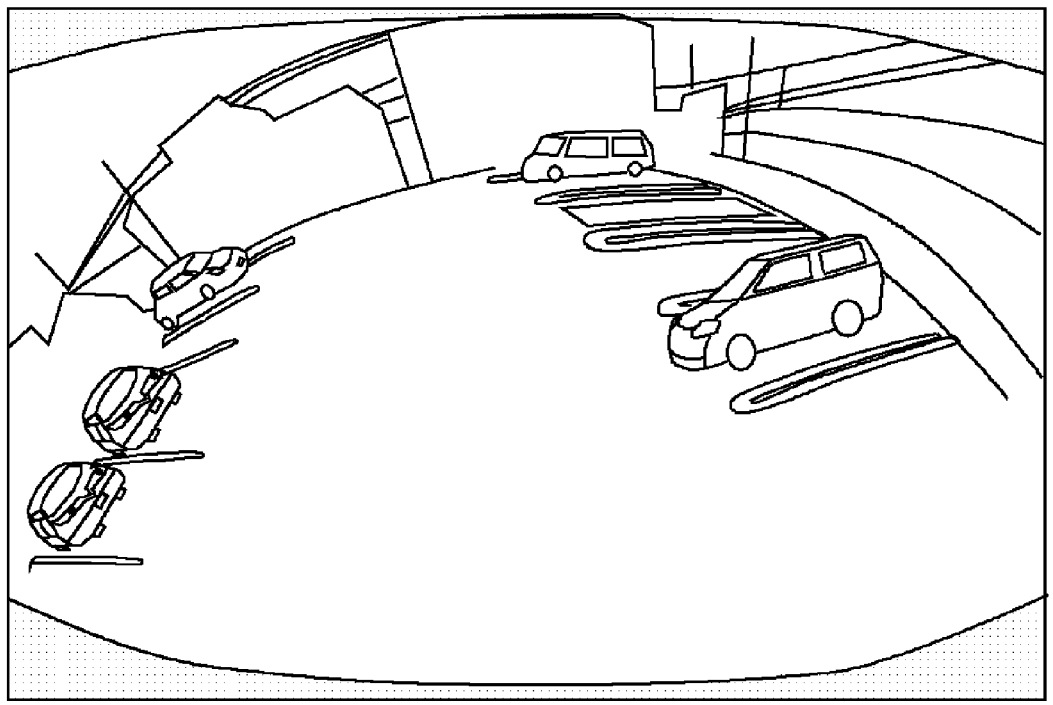
FIG. 5 is a view illustrating an image of the rear side of the vehicle.

Now, the second selecting process will be described. FIGS. 4 and 5 are views for explaining the second selecting process. FIG. 4 is a view for facilitating understanding of the second selecting process, and is a bird's-eye view illustrating the surrounding area of a vehicle 1. Also, FIG. 5 is a view illustrating an image taken by the rear camera 24 and displayed on the display 4.

The second selecting process is a process of selecting an available parking area according to the distances from obstacles such as other vehicles existing in adjacent parking areas (the degrees of closeness), in a case where there are two consecutive parking areas as available parking areas. Hereinafter, the second selecting process will be described specifically.

On the basis of information on the coordinate values and the like of available parking areas detected by the detecting unit 31a, the parking assist device 3 determines the locations of the available parking areas. In a case where there are two consecutive available parking areas, the parking assist device derives the distances from obstacles (other vehicles) existing in parking areas adjacent to the individual available parking areas. Then, the selecting unit 31c selects an available parking area having a larger distance (that is, an area having a lower degree of closeness).

In the example of FIG. 4, first, if the driver tries to back the vehicle 1 for parking the vehicle in a parking lot, the detecting unit 31a detects five available parking areas PA6 to PA10 existing on the rear side of the vehicle 1.

Then, on the basis of the locations of the detected individual available parking areas PA6 to PA10, the selecting unit 31c determines whether there are two consecutive available parking areas in line. In the example of FIG. 4, there are two consecutive available parking areas PA6 and PA7, and the selecting unit 31c selects the available parking area PA7 farther from an obstacle.

Specifically, on the basis of information on the detected parking areas and the result of obstacle detection, the detecting unit 31a derives the distances between the individual available parking areas and obstacles (the degrees of closeness). In other words, the detecting unit 31a derives the distance between the available parking area PA6 and another vehicle 10 parked in the adjacent parking area PA11. Also, the detecting unit 31a derives the distance between the available parking area PA7 and another vehicle 10 parked in the adjacent parking area PA12.

Then, the selecting unit 31c compares the derived distances, and selects an available parking area having a larger distance (that is, an area having a lower degree of closeness), as an available parking area where it is possible to more safely park the vehicle. In the example of FIG. 4, since the distance between the available parking area PA7 and another vehicle 10 parked in the parking area PA12 is larger than the distance between the available parking area PA6 and another vehicle 10 parked in the parking area PA11, the available parking area PA7 is selected.

Thereafter, it is possible to display a boxed frame line on the corresponding area on the image taken as shown in FIG. 5 by the rear camera 24, thereby offering the selected available parking area to the driver.

As described above, even in a case where there are obstacles in adjacent parking areas, an available parking area having a larger distance from an obstacle (that is, an area having a lower degree of closeness) is selected and is offered to the driver. Therefore, it is possible to park the vehicle 1 in a safer available parking area where the risk of contact with obstacles such as other vehicles during parking or when passengers get out of the vehicle is low.

Figure 6:
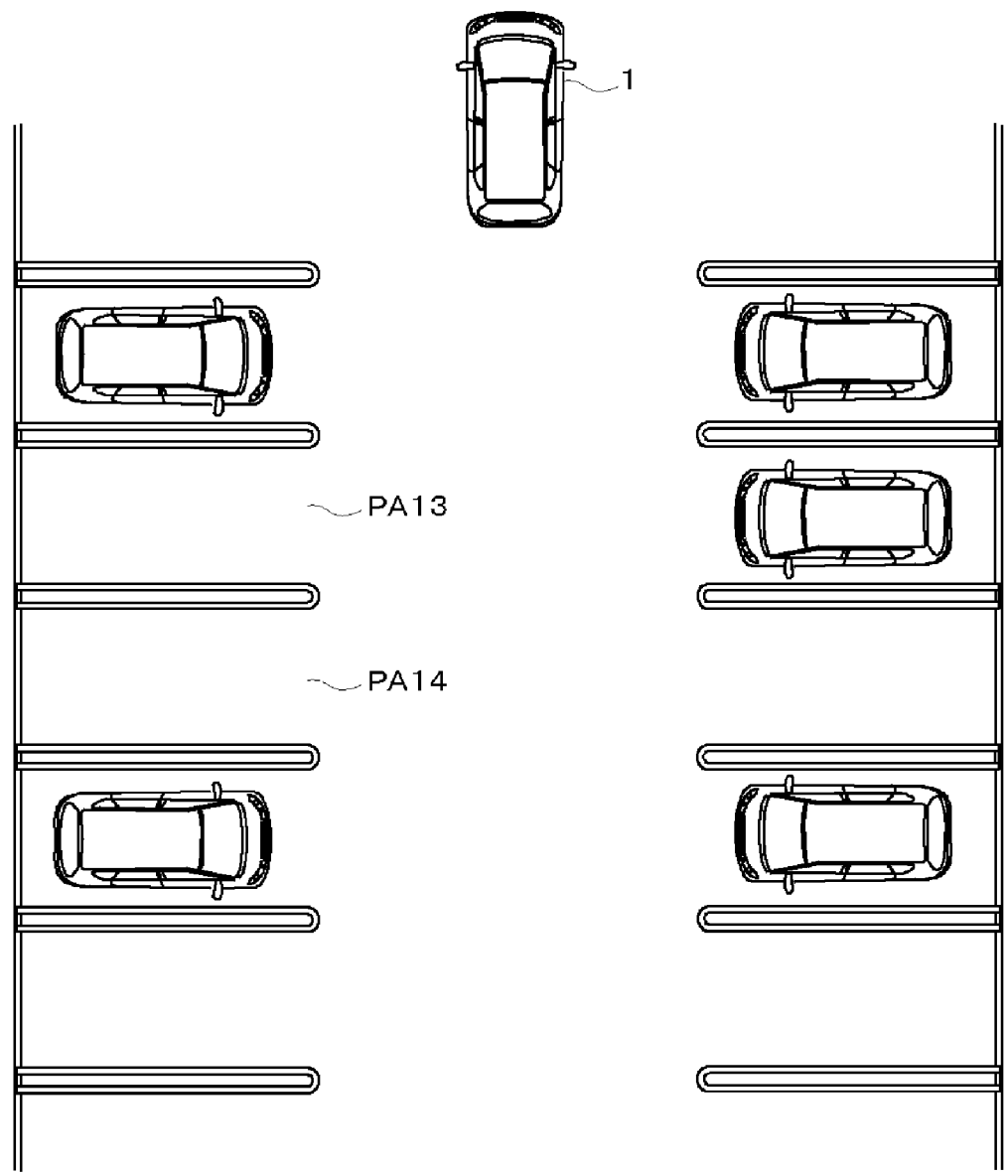
FIG. 6 is a bird's-eye view of the surrounding area of the vehicle.
Figures 7, 8:
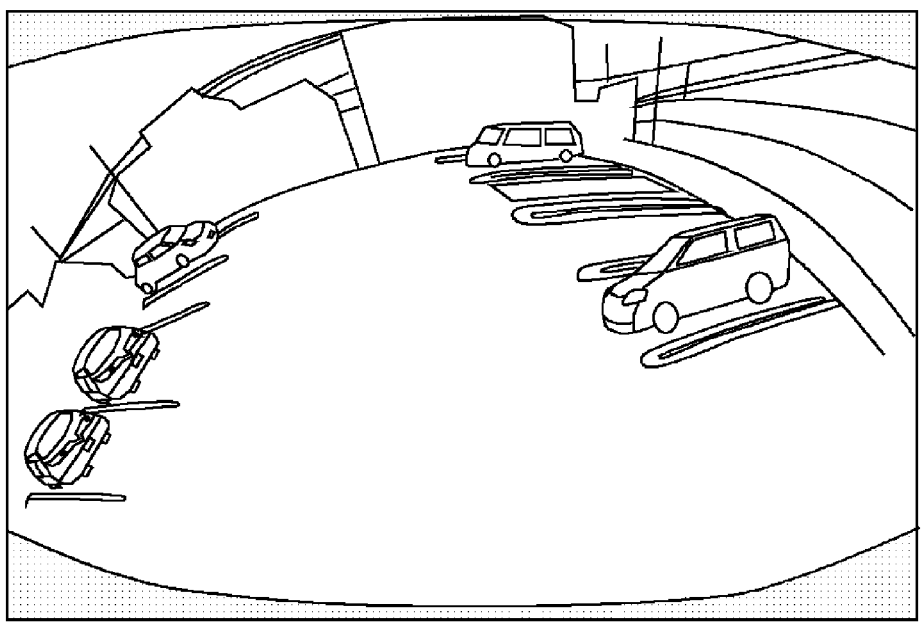
FIG. 7 is a view illustrating the relation between passenger location conditions and available parking areas.
FIG. 8 is a view illustrating an image of the rear side of the vehicle.

Now, the third selecting process will be described. FIGS. 6 to 8 are views for explaining the third selecting process. FIG. 6 is a view for facilitating understanding of the third selecting process, and is a bird's-eye view illustrating the surrounding area of a vehicle 1. FIG. 7 is a view illustrating the relation between passenger location conditions and available parking areas to be selected. Also, FIG. 8 is a view illustrating an image taken by the rear camera 24 and displayed on the display 4.

The third selecting process is a process of selecting an available parking area depending on the passenger location condition of the vehicle 1 in a case where there are two consecutive parking areas as available parking areas and the distances between the available parking areas and obstacles such as other vehicles existing in adjacent parking areas (the degrees of closeness) are the same. Hereinafter, the third selecting process will be described.

If the parking assist device 3 detects two consecutive available parking areas PA13 and PA14, similarly in the second selecting process, the parking assist device derives the distances from obstacles existing in adjacent parking areas. Then, the selecting unit 31c compares the left distance and the right distance. In a case where they are the same, the selecting unit acquires information on the passenger location condition from the passenger detecting unit 5, and selects an available parking area corresponding to the passenger location condition.

FIG. 7 shows the correspondence relation between patterns in which passengers sit in a vehicle having four seats of the driver's seat, the front passenger seat, the rear right seat, and the rear left seat and available parking areas to be selected. A mark "○" represents that a passenger is sitting in a corresponding seat, and a mark "×" represents an available parking area to be selected. A table representing that correspondence relation may be stored in the storage unit 33 of the parking assist device 3 in advance. On the basis of the information acquired from the passenger detecting unit 5 and the table shown in FIG. 7, the selecting unit 31c selects an available parking area associated with the passenger location condition.

For example, if determining that passengers are sitting in the driver's seat, the front passenger seat, and the rear left seat, on the basis of the information acquired from the passenger detecting unit 5, the selecting unit 31c selects the right available parking area (in the example of FIG. 6. the available parking area PA14). Meanwhile, if determining that passengers are sitting in the driver's seat and the rear right seat, on the basis of the information acquired from the passenger detecting unit 5, the selecting unit 31c selects the left available parking area (in the example of FIG. 6. the available parking area PA13).

In the present embodiment, as an example, the selecting unit compares the number of passengers sitting in the right seats of the vehicle (the driver's seat and the rear right seat) with the number of passengers sitting in the left seats of the vehicle (the front passenger seat and the rear left seat), thereby determining an available parking area to be selected. In a case where the number of passengers of the right seats is larger, the selecting unit selects the left available parking area; whereas in a case where the number of passengers of the left seats is larger, the selecting unit selects the right available parking area. Since a selection is made such that an area having no obstacles is positioned on the side where there are more passengers, it becomes possible to avoid contact with other vehicles as much as possible when passengers get out of the vehicle after parking.

Also, in the present embodiment, in a case where the number of passengers of the right seats and the number of passengers of the left seats are the same, the selecting unit selects the right available parking area. The reason is that it is considered that the possibility that the driver is accustomed to open and close the door when getting out of the vehicle is high and thus it is safer to make a selection such that an area having no obstacles is positioned on the front passenger seat side. However, the available parking area on the opposite side may be selected.

For example, in a case where the right available parking area (the available parking area PA14 of FIG. 6), it is possible to display a boxed frame line on the corresponding area in the image taken as shown in FIG. 8 by the rear camera 24, thereby offering the selected available parking area to the driver.

As described above, in a case where there are obstacles in adjacent parking areas, if the distances from the individual obstacles are the same, an available parking area corresponding to the passenger location condition is selected. Therefore, it is possible to park the vehicle 1 in a safer available parking area where the risk of contact with obstacles such as other vehicles during parking or when passengers get out of the vehicle is low.

Although FIG. 7 illustrates, as an example, the four-seater vehicle having four seats, even with respect to vehicles having different numbers of seats, such as five-seater vehicles and seven-seater vehicles, similar tables can be applied. The individual tables may be stored in advance such that it is possible to use a table according to the number of seats of each vehicle.

Also, as the results of the first to third selecting processes, a plurality of available parking areas which can be selected may exist. In this case, all available parking areas may be selected, or any other selection condition may be added.

Figure 9:
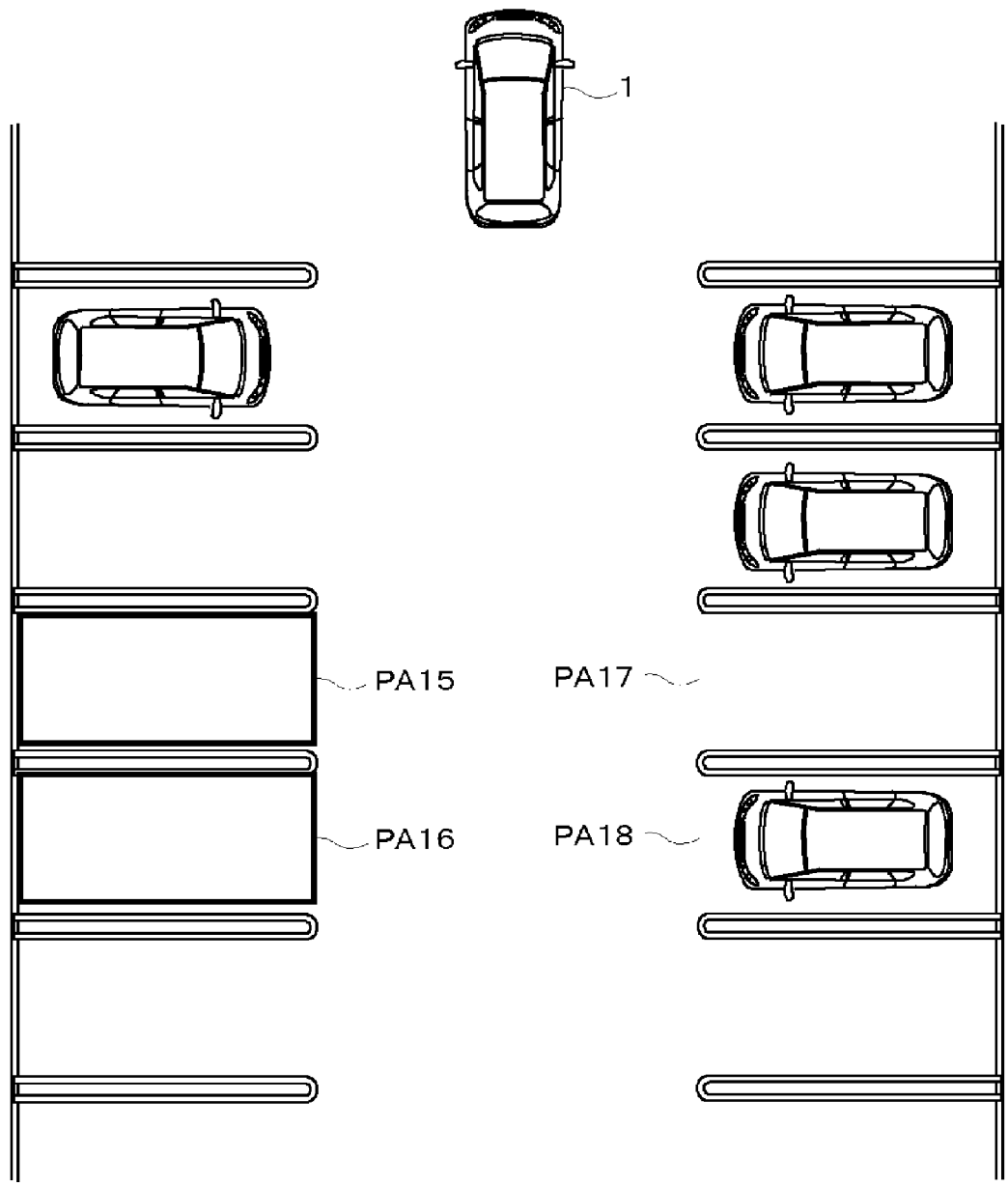
FIG. 9 is a bird's-eye view of the surrounding area of the vehicle.
Figure 10:
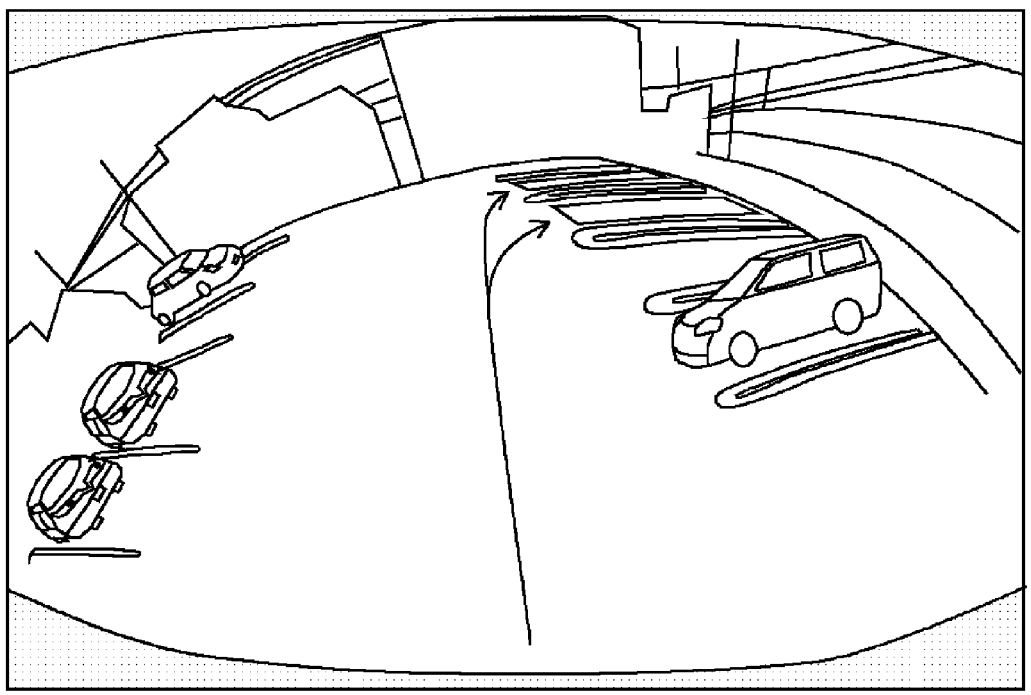
FIG. 10 is a view illustrating an image of the rear side of the vehicle.

For example, a condition on whether there is any obstacle in an area positioned on the front side of each available parking area may be added to the selection condition. Specifically, there is a method of adding a condition on whether there is another vehicle parked in an area facing each available parking area, to the selection condition, in a case of parking the vehicle in a parking lot where there is a plurality of consecutive parking areas on each of the left side and the right side as shown in FIG. 9. In this case where a condition on whether there is another vehicle in a parking area facing each available parking area is added to the selection condition, according to the result thereof, an available parking area to be selected is determined.

As an example, FIG. 9 will be described specifically. In a case where there are four consecutive available parking areas, since there are two available parking areas (PA15 and PA16) other than the outermost areas, in the first selecting process, both available parking areas are selectable.

Then, the selecting unit determines whether there is another vehicle parked in each of the parking areas (PA17 and PA18) facing the individual available parking areas, and selects an available parking area facing a parking area where there is no vehicle. In other words, the selecting unit 31c determines whether each of the facing areas is an available parking area, and selects an area facing an available parking area. In the example of FIG. 9, since there is no vehicle in the available parking area PA17 and there is another vehicle in the available parking area PA18, the selecting unit 31c finally selects the available parking area PA15 facing the area where there is no vehicle.

Also, in a case where there is a plurality of available parking areas which can be selected, if all of areas facing the selectable areas are available parking areas, since the selectable areas are on par with each other, both areas may be selected.

Also, while a boxed line is displayed on the selected available parking area, a guide line may be displayed on the image at a position corresponding to a movement route to the selected available parking area. As a result, the driver can grasp not only the location of the available parking area but also the movement route to the available parking area. Further, in a case where the number of selected available parking areas is two or more, guide lines may be displayed on the image at positions corresponding to all of the movement routes to the selected available parking areas.

For example, in the example shown in FIG. 9, if both of the available parking areas PA15 and PA16 are selected, guide lines are displayed on the image at positions corresponding to the movement routes to the individual available parking areas PA15 and PA16.

In this case, in a case where the user selects any one available parking area, it may be possible to eliminate all guide lines except for the guide line to the selected available parking area. Also, in a case where which available parking area the vehicle 1 is heading is estimated on the basis of the traveling direction of the vehicle, it may be possible to eliminate all guide lines except for the guide line to the estimated available parking area.

<1-3. Process of Parking Assist System>

Figure 11:
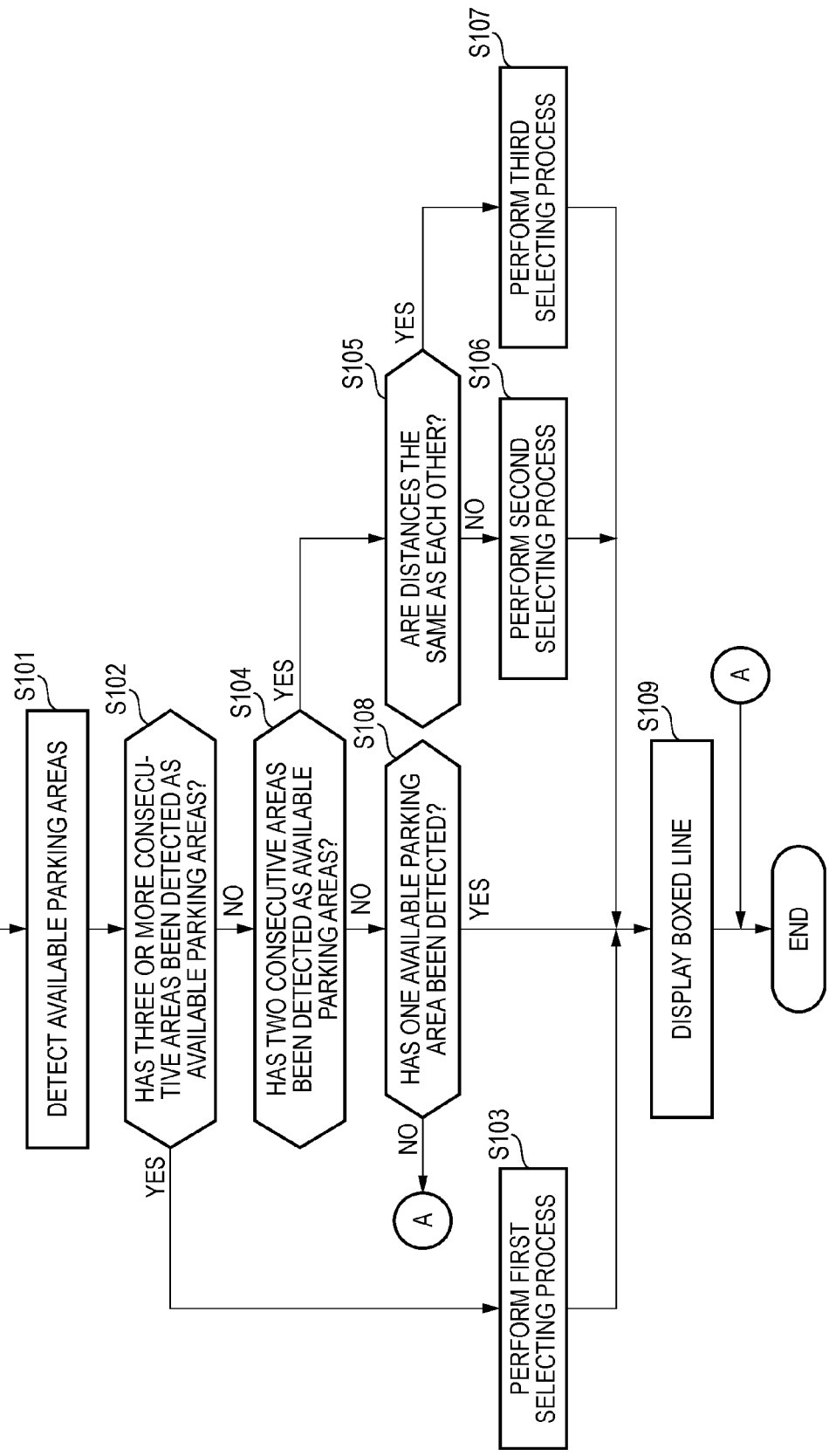
FIG. 11 is a flow chart illustrating a process of the parking assist system.

Now, a process of the parking assist system 100 will be described. FIG. 11 is a flow chart illustrating the process of the parking assist system 100.

The parking assist system 100 starts up if the vehicle is ready for parking, for example, if the vehicle gets into reverse gear. Even in a case where the user turns on a parking assist start switch, the parking assist system starts up. If starting up, the parking assist system 100 detects available parking areas in STEP S101. In other words, the parking assist system detects parking frames, for example, on the basis of a taken image by the rear camera 24, as described above, thereby detecting parking areas. Then, the parking assist system detects obstacles, and detects available parking areas on the basis of the result of obstacle detection.

In STEP S102, the parking assist system 100 determines whether three or more consecutive available parking areas have been detected in the process of detecting available parking areas. The parking assist system 100 makes a determination on consecutiveness on the basis of the coordinate values and the like of the available parking areas.

In a case where there are three or more consecutive areas as available parking areas ("Yes" in STEP S102), in STEP S103, the parking assist system 100 performs the first selecting process. In other words, the parking assist system selects an available parking area other than the outermost areas of the consecutive available parking areas. Subsequently, in STEP S109, the parking assist system 100 displays a boxed line on the image taken by the rear camera 24, at a position corresponding to the selected available parking area.

In contrast, in a case where there are not three or more consecutive areas as available parking areas ("No" in STEP S102), in STEP S104, the parking assist system 100 determines whether there are two consecutive areas as available parking areas. In a case where there are two consecutive areas as available parking areas ("Yes" in STEP S104), in STEP S105, the parking assist system 100 determines whether the distances between the individual available parking areas and obstacles of adjacent areas (the degrees of closeness) are the same as each other. For example, in order for this determination, the parking assist system can derive the distances on the basis of the coordinate values of the parking frames or the available parking areas and the coordinate values of the obstacles detected on the basis of the taken image by the rear camera 24.

In a case where the distances between the individual available parking areas and the obstacles are not the same as each other ("No" in STEP S105), the parking assist system performs the second selecting process. In other words, the parking assist system 100 compares the distances and selects an available parking area having a larger distance. Subsequently, in STEP S109, the parking assist system 100 displays a boxed line on an image taken by the rear camera 24, at a position corresponding to the selected available parking area.

Meanwhile, in a case where the distances between the individual available parking areas and the obstacles are the same as each other ("Yes" in STEP S105), the parking assist system performs the third selecting process. In other words, the parking assist system 100 selects an available parking area corresponding to the passenger location condition of the vehicle. Subsequently, in STEP S109, the parking assist system 100 displays a boxed line on an image taken by the rear camera 24, at a position corresponding to the selected available parking area.

Meanwhile, in a case where two consecutive areas have not been detected as available parking areas ("No" in STEP S104), in STEP S108, the parking assist system 100 determines whether one available parking area has been detected. In a case where one available parking area has been detected ("Yes" in STEP S108), in STEP S109, the parking assist system 100 displays a boxed line on the image taken by the rear camera 24, at a position corresponding to the detected available parking area.

Meanwhile, in a case where any available parking area has not been detected ("No" in STEP S108), the parking assist system 100 finishes without performing processes such as selection and offering of an available parking area.

Also, in the flow chart shown in FIG. 11, in a case where two consecutive areas are detected as available parking areas, the parking assist system performs the second selecting process or the third selecting process depending on the distances from obstacles. However, the present invention is not limited thereto. For example, regardless of the distances from obstacles, the parking assist system may perform only the third selecting process. In other words, in this case, regardless of the distances from obstacles, an available parking area is selected according to the passenger location condition.

Also, the flow chart shown in FIG. 11 may additionally include a process having a selection condition on whether there is any obstacle in an area positioned on each available parking area. In this case, after the first selecting process of STEP S103, the second selecting process of STEP S106, or the third selecting process of STEP S107, the parking assist system 100 performs a process of determining whether there is any obstacle in each of facing areas positioned on the front sides of available parking areas, and selects an available parking area facing an area where there is no obstacle. Subsequently, in STEP S109, the parking assist system 100 displays a boxed line with respect to the selected available parking area.

Also, the flow chart shown in FIG. 11 may additionally include a process of displaying a guide line on the image at a position corresponding to the movement route to the selected available parking area. In this case, after an available parking area is selected, the parking assist system may display a guide line together with a boxed line on the image. Further, it is possible to add a process of displaying only a guide line to an available parking area where the driver tries to park the vehicle, in a case where a plurality of available parking areas is selected and a plurality of guide lines is displayed. In this case, if an available parking area for parking is determined by a user's instruction or an available parking area where the driver is trying to park the vehicle is determined on the basis of the result of estimation on the traveling direction of the vehicle, the parking assist system may perform a process of eliminating all guide lines except for the guide line representing the movement route to the determined available parking area.

1. Second Embodiment

Now, a second embodiment will be described. In the first embodiment, the configuration for selecting an available parking area to be offered to the driver on the basis of the sequence of detected available parking areas and the passenger location condition has been described. However, the present invention is not limited thereto. For example, a parking assist system may be configured so as to retain evaluation values representing the degrees of parking appropriateness according to the surrounding conditions such as whether there is any obstacle, and quantify the degrees of parking appropriateness of individual detected available parking areas on the basis of the evaluation values, and selects an available parking area to be offered to a driver on the basis of the result of quantification. Hereinafter, this configuration will be described with focus on the differences from the first embodiment.

<2-1. Configuration of Parking Assist System>

Figure 12:
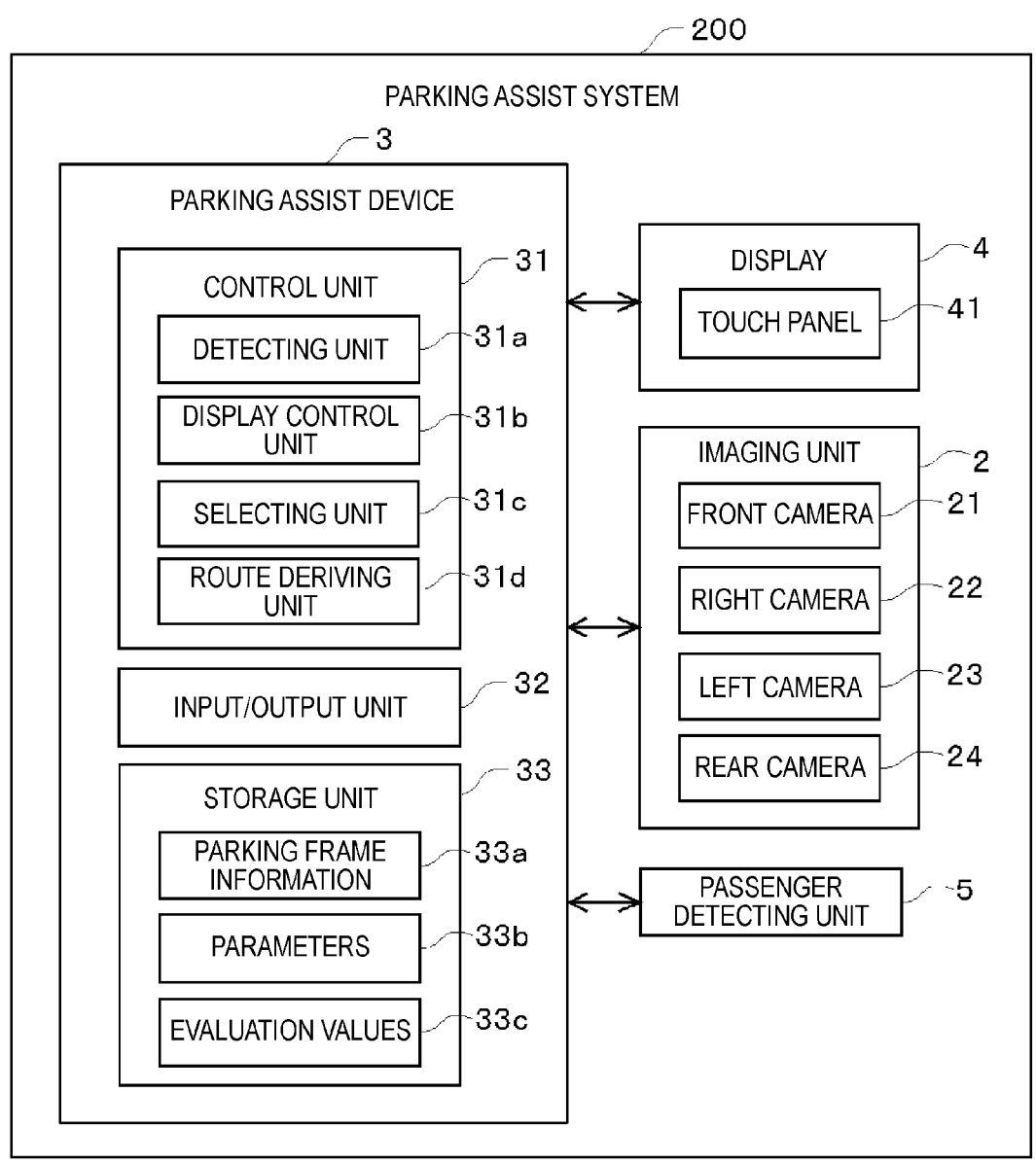
FIG. 12 is a view illustrating the outline of another parking assist system.

FIG. 12 is a block diagram illustrating the configuration of a parking assist system 200 according to the present embodiment. Similarly in the first embodiment, the parking assist system 200 according to the present embodiment is a system for offering an available parking area where it is possible to more safely park a vehicle to the driver of a vehicle.

As shown in FIG. 12, the parking assist system 200 includes an imaging unit 2, a parking assist device 3, a display 4, and a passenger detecting unit 5. Among these units, the imaging unit 2, the display 4, and the passenger detecting unit 5 are identical to the components described in the parking assist system 100 of the first embodiment, and thus will not be described.

The parking assist device 3 is an electronic control device which detects available parking areas for the vehicle, and selects an available parking area appropriate for parking the vehicle, from the detected available parking areas. The parking assist device 3 includes a control unit 31, an input/output unit 32, and a storage unit 33.

The parking assist device 3 of the present embodiment is different from that of the first embodiment in that evaluation values 33c are retained in the storage unit 33 and the selecting unit 31c selects an available parking area on the basis of the evaluation values 33c. The other configuration is the same as that in the first embodiment, and the differences will be mainly described below.

The evaluation values 33c are values representing the degrees of appropriateness including the degrees of parking difficulty set for evaluation items which are surrounding conditions of the vehicle such as obstacle conditions. On the basis of the evaluation values 33c, the parking assist device 3 of the present embodiment selects an available parking area where it is possible to more safely park the vehicle, as an available parking area appropriate for parking, from detected available parking areas.

FIG. 13 is a view for explaining the evaluation values 33c. As shown in FIG. 13, the evaluation values 33c are values associated with conditions such as whether there is any obstacle in each surrounding area, and are values representing the degrees of parking appropriateness including the degrees of parking difficulty under the individual conditions. For example, in the example of FIG. 13, an evaluation value corresponding to an evaluation item "THERE IS NO OBSTACLE ON BOTH SIDES" in a case where there is no obstacle in the left and right adjacent areas of an available parking area is "1", and an evaluation value corresponding to an evaluation item "THERE IS OBSTACLE ON RIGHT SIDE" in a case where there is an obstacle on the right side is "2". As described above, in the example of FIG. 13, for an evaluation item of a condition in which the degree of easiness of parking is high (a condition in which the degree of parking difficulty is low), a smaller evaluation value is set. Also, in a case where some evaluation items are the same in the degree of parking difficulty, for an evaluation item more appropriate for parking, a smaller evaluation value is set.

Also, the evaluation values shown in FIG. 13 are merely examples, and can be appropriately changed. Also, it is possible to add other conditions as surrounding conditions. Further, although the present embodiment uses an adding system for adding evaluation values associated with corresponding conditions, a subtracting system for subtracting evaluation values may be used.

The selecting unit 31c derives the degrees of parking appropriateness with respect to all available parking areas detected by the detecting unit 31a, on the basis of the evaluation values 33c, and selects an available parking area to be offered to the driver, on the basis of the result of derivation.

<2-2. Process of Selecting Available Parking Area>

Now, a process of the selecting unit 31c of the parking assist device 3 for selecting an available parking area to be offered to the driver will be described. This selecting process is a process of deriving the degree of parking appropriateness on the basis of the evaluation values 33c set according to the surrounding conditions of the vehicle such as whether there is any obstacle in the surroundings of each detected available parking area, and selecting an available parking area where it is possible to more safely park the vehicle (the risk of contact with obstacles such as other vehicles is low), on the basis of the result of derivation.

Figure 14:
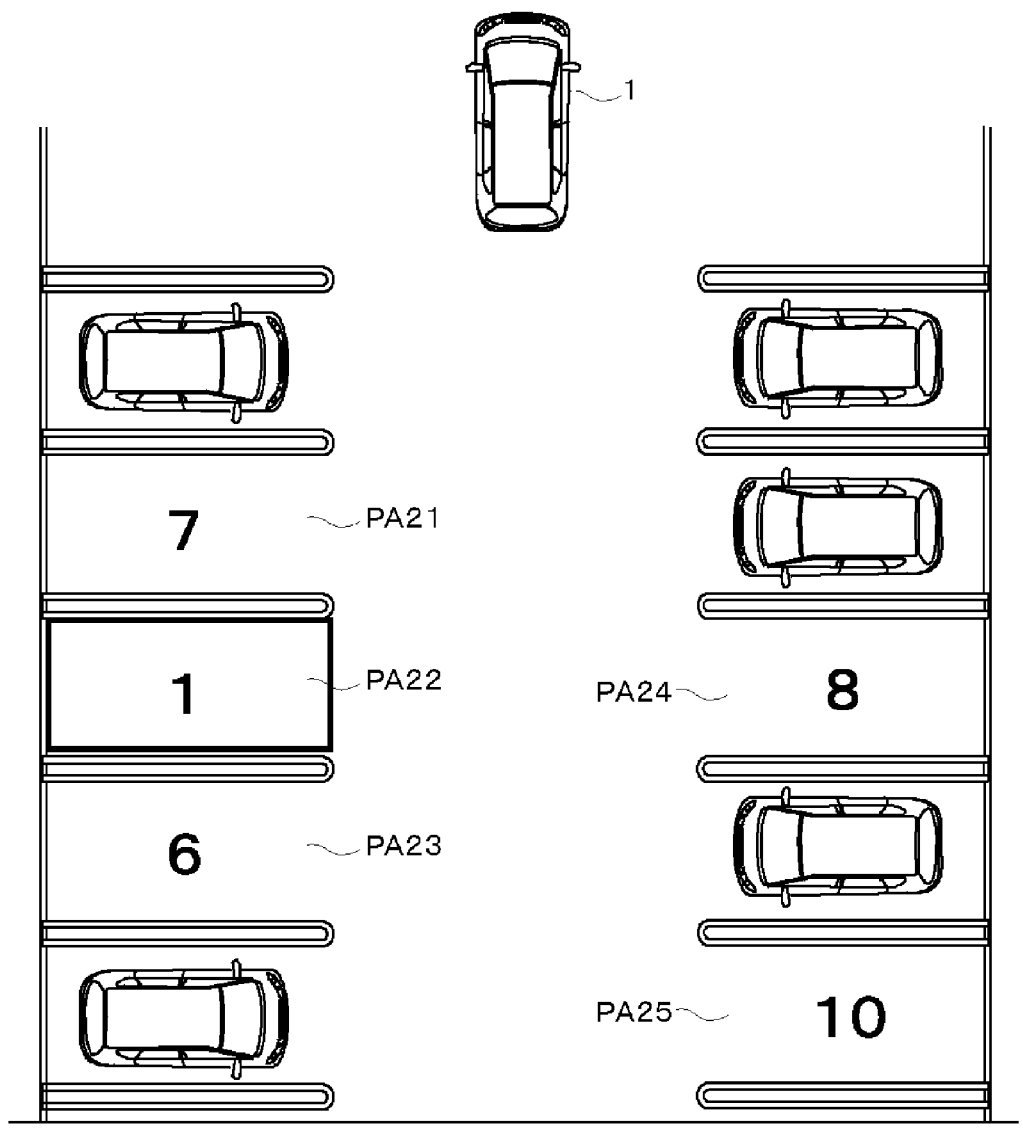
FIG. 14 is a view for explaining parking appropriateness.

This will be described specifically with reference to FIG. 14. FIG. 14 is a view for facilitating understanding of the process of selecting an available parking area, and is a bird's-eye view illustrating the surrounding area of a vehicle 1.

FIG. 14 shows an example in which five available parking areas PA21 to PA25 have been detected by the same detecting process as that in the first embodiment. The selecting unit 31c determines which surrounding conditions shown in FIG. 13 each available parking area corresponds to, and adds evaluation values associated with the corresponding conditions.

As an example, the available parking area PA21 will be described specifically. Since there is an obstacle (another vehicle) in a parking area positioned on the left side of the available parking area PA21, and the distance from the obstacle is a medium distance, evaluation values "3" and "2" are added. Further, since there is an obstacle (another vehicle) in an area positioned on the front side, an evaluation value "2" is added. Therefore, the degree of parking appropriateness of the available parking area PA21 becomes "7" (=3+2+2).

In a case of the available parking area PA22, since there is no obstacle in areas positioned on both sides of the available parking area PA22 and there is no obstacle in an area positioned on the front side, only an evaluation value "1" is added. In other words, the degree of parking appropriateness of the available parking area PA22 becomes "1".

If the degrees of parking appropriateness of the other available parking areas are derived similarly, the degrees of parking appropriateness of the available parking areas PA23, PA24, and PA25 become "6", "8", and "10", respectively. If deriving the degrees of parking appropriateness with respect to all available parking areas, the selecting unit 31c selects an available parking area having the lowest degree of parking appropriateness (the minimum sum of evaluation values). In the example of FIG. 14, the available parking area PA22 is selected.

As described above, in the present embodiment, since the degrees of parking appropriateness are derived on the basis of the evaluation values set for the evaluation items such as whether there is any obstacle in the surroundings of each detected available parking area, it is possible to park the vehicle 1 in a safer available parking area where the risk of contact with obstacles such as other vehicles during parking or when passengers get out of the vehicle is low.

Also, after an available parking area is selected, similarly in the first embodiment, a boxed line is displayed at a corresponding position on the image taken by the rear camera 24, whereby it is possible to offer the location of the available parking area to the driver (see FIG. 3). However, the present invention is not limited thereto. In order to offer the available parking area to the driver, a boxed line may be displayed at a corresponding position on a bird's-eye view image. Further, in these cases, at positions corresponding to the selected available parking area and the other available parking areas, the derived degrees of parking appropriateness may be displayed, respectively.

Also, in the process of selecting an available parking area, an allowable value may be set in advance. The allowable value is a threshold value for the degree of parking appropriateness and is used to select an available parking area. For example, the parking assist device 3 can use a method of selecting all available parking areas having the degrees of parking appropriateness equal to or less than the allowable value.

Figure 15:
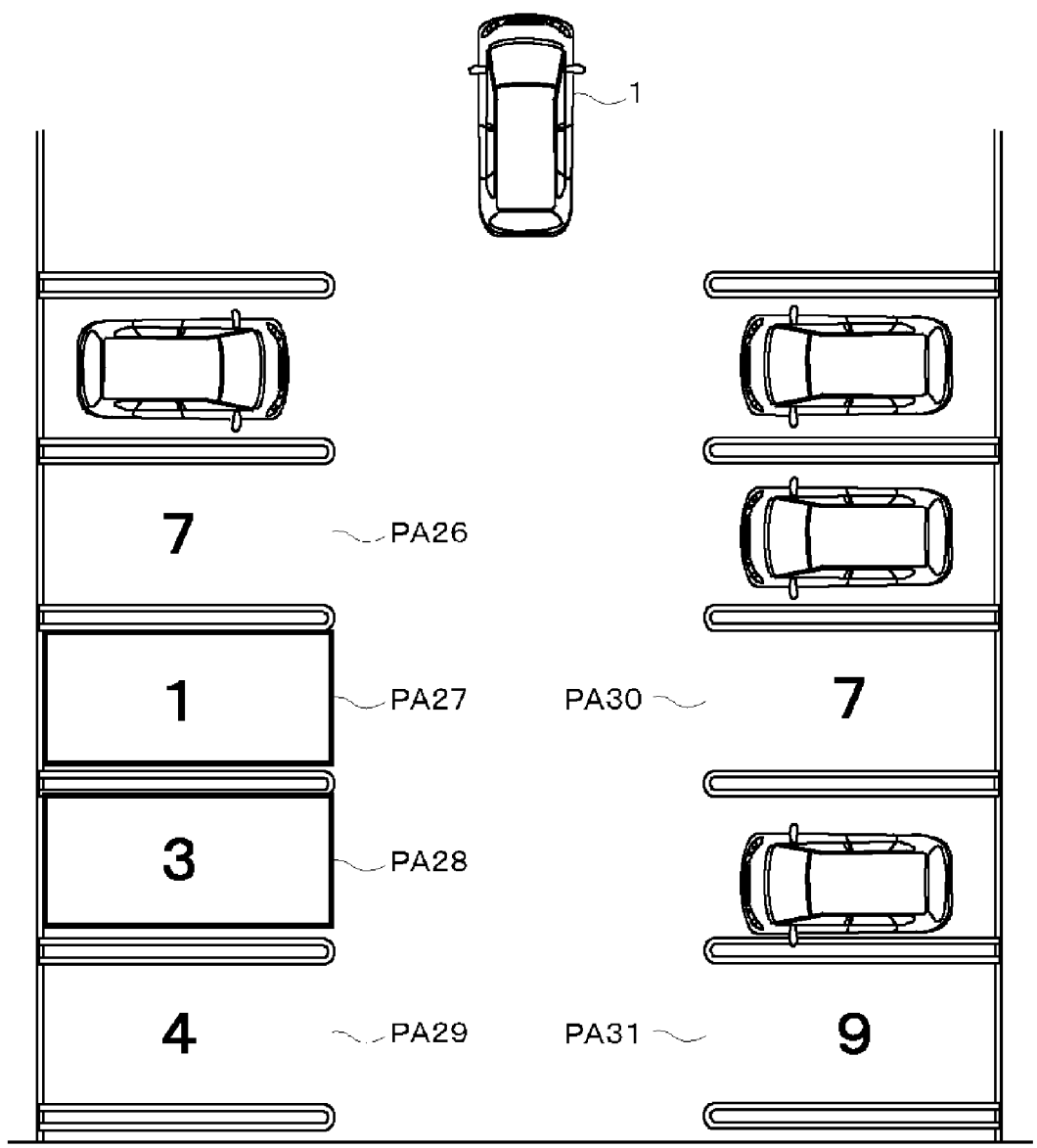
FIG. 15 is a view for explaining parking appropriateness.

This will be described specifically with reference to FIG. 15. FIG. 15 is a view for facilitating understanding of the process of selecting an available parking area, and is a bird's-eye view illustrating the surrounding area of a vehicle 1.

FIG. 15 shows an example in which six available parking areas PA26 to PA31 have been detected by the same detecting process as that in the first embodiment. The selecting unit 31c performs a process of deriving the degrees of parking appropriateness of the detected available parking areas similarly in the case of FIG. 15. As a result, the degrees of parking appropriateness of the available parking areas PA26 to PA31 become "7", "1", "3", "4", "7", and "9", respectively.

Here, if it is assumed that the allowable value is "3", the available parking area PA27 for which the degree of parking appropriateness is "1", and the available parking area PA28 for which the degree of parking appropriateness is "3" are selected, and the other available parking areas are not selected. In other words, the available parking areas having the degrees of parking appropriateness equal to or less than the allowable value are selected, and the available parking areas having the degrees of parking appropriateness exceeding the allowable value are not selected.

Even in this case, after the available parking areas are selected, boxed lines may be displayed at corresponding positions on an image taken by the rear camera 24, and boxed lines may be displayed at corresponding positions on a bird's-eye view image. Also, the degrees of parking appropriateness of the selected available parking areas and the degrees of parking appropriateness of the other available parking areas may be additionally displayed.

<2-3. Process of Parking Assist System>

Figure 16:
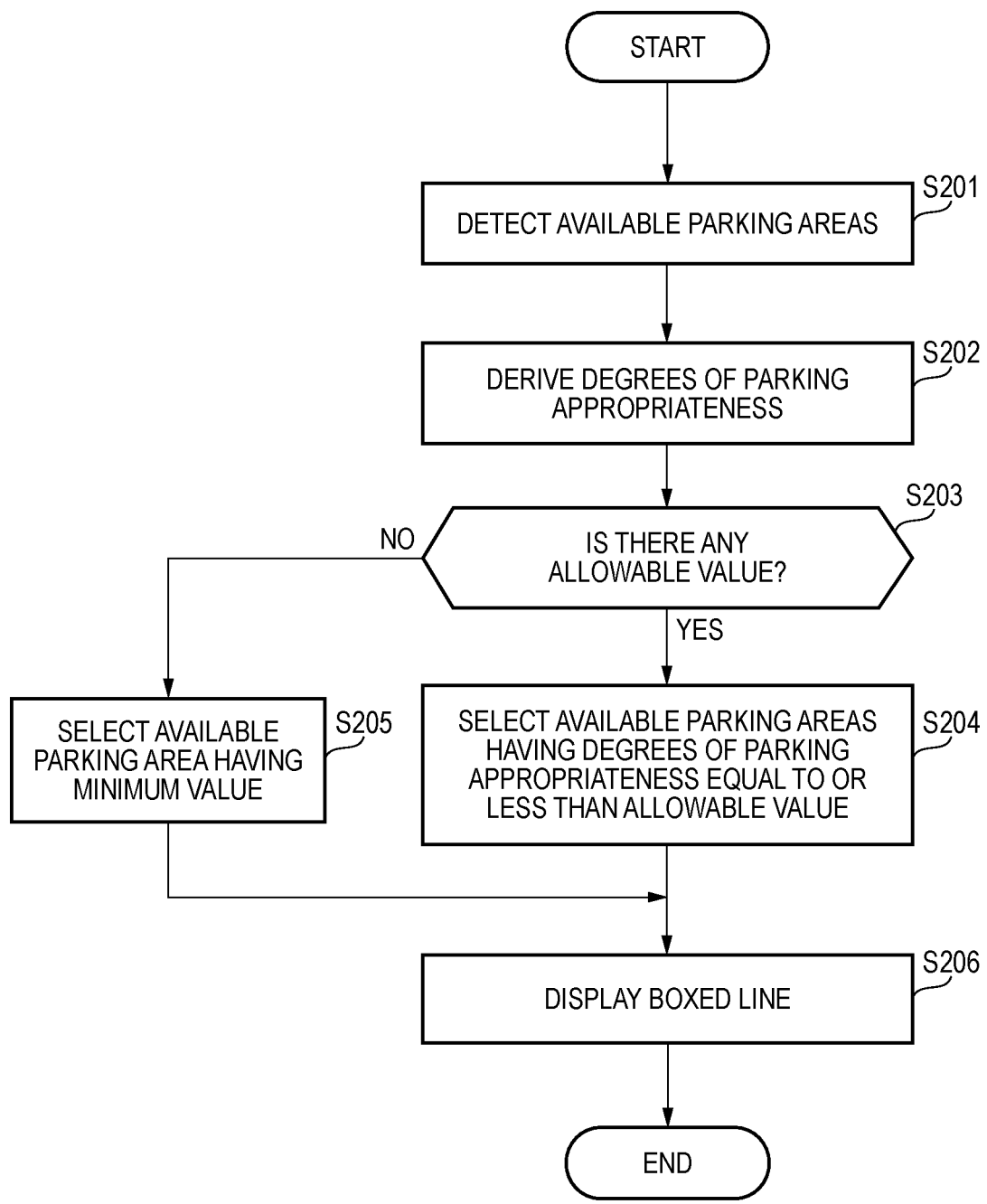
FIG. 16 is a flow chart illustrating a process of the parking assist system.

Now, a process of the parking assist system 200 will be described. FIG. 16 is a flow chart illustrating the process of the parking assist system 200.

Similarly in the first embodiment, the parking assist system 200 starts up if the vehicle is ready for parking, for example, if the vehicle gets into reverse gear. Also, even in a case where the user turns on a parking assist start switch, the parking assist system starts up. If starting up, the parking assist system 200 detects available parking areas in STEP S201. This is the same process as STEP S101 described above.

Subsequently, in STEP S202, the parking assist system 200 derives the degrees of parking appropriateness. This is performed by adding evaluation values associated with evaluation items determined as the surrounding conditions of each of the detected available parking areas.

Subsequently, in STEP S203, the parking assist system 200 determines whether any allowable value has been set. In a case where an allowable value has been set ("Yes" in STEP S203), in STEP S204, the parking assist system 200 selects each available parking area having the degree of parking appropriateness (the sum of evaluation values) equal to or less than the allowable value. Meanwhile, in a case where any allowable value has not been set ("No" in STEP S203), in STEP S205, the parking assist system 200 selects an available parking area having the lowest degree of parking appropriateness (the minimum sum of evaluation values).

Subsequently, in STEP S206, the parking assist system 200 displays a boxed line on an image taken by the rear camera 24, at a position corresponding to each selected available parking area. In a case of displaying a bird's-eye view image, the parking assist system displays a boxed line at each corresponding position on the bird's-eye view image, and in a case of displaying the degrees of parking appropriateness, the parking assist system displays the degrees of parking appropriateness at positions corresponding to the available parking areas, respectively.

Also, the flow chart shown in FIG. 16 may additionally include a process of displaying a guide line on the image at a position corresponding to the movement route to the selected available parking area. In this case, after an available parking area is selected, the parking assist system may display a guide line together with a boxed line on the image. Further, it is possible to add a process of displaying only a guide line to an available parking area where the driver tries to park the vehicle, in a case where a plurality of available parking areas is selected and a plurality of guide lines is displayed. In this case, if an available parking area for parking is determined by a user's instruction or an available parking area where the driver is trying to park the vehicle is determined on the basis of the result of estimation on the traveling direction of the vehicle, the parking assist system may perform a process of eliminating all guide lines except for the guide line representing the movement route to the determined available parking area.

3. Modifications

Although the embodiments of the present invention have been described above, the present invention is not limited to the embodiments, and can be modified in various forms. Hereinafter, these modifications will be described. All forms including the embodiments described above and the following forms to be described below can be appropriately combined.

In the above described second embodiment, the evaluation values may differ depending on passenger location conditions of the vehicle. FIG. 17 is a view for explaining evaluation values according to the present modification. As shown in FIG. 17, evaluation values differ depending on passenger location conditions of the vehicle representing whether there is a passenger in the front passenger seat. An item "THERE IS PASSENGER" represents a case where there is a passenger in the front passenger seat of the vehicle, and an item "THERE IS NO PASSENGER" represents a case where there is no passenger in the front passenger seat of the vehicle.

In the example of FIG. 17, the case where there is a passenger in the front passenger seat and a case where there is no passenger in the front passenger seat are different from each other in evaluation values corresponding to items "THERE IS OBSTACLE ON RIGHT SIDE" and "THERE IS OBSTACLE ON LEFT SIDE". The reason is that, in the case where there is a passenger in the front passenger seat, in order to make it possible for the passenger in the front passenger seat to safely get off and in, it is preferable to park the vehicle with a space on the left side of the vehicle; whereas in the case where there is no passenger in the front passenger seat, in order to make it possible for the driver to safely get off and in, it is preferable to park the vehicle with a space on the right side of the vehicle.

Also, in each embodiment described above, load location conditions may be included in the passenger location conditions. In other words, available parking areas to be selected differ depending on which seats loads are on. Although there is no passenger in a seat, if a load is on the seat, it is necessary to open and close a corresponding door when passengers get out of the vehicle. If an available parking area is selected in view of the load location condition, it is possible to minimize the risk of contact with obstacles such as other vehicles when taking loads in and out.

Also, in each embodiment described above, an available parking area may be selected even in view of whether there is any obstacle on the rear side of each available parking area. If obstacles on the rear sides of available parking areas are considered, for example, in a case where there is another vehicle parked on the rear side of an available parking area, it is possible to minimize the risk of contact with the corresponding vehicle when opening and closing the back door.

Also, in each above described embodiment, various functions are implemented in a software wise by arithmetic processing of the CPU according to programs. However, some of those functions may be implemented by electric hardware circuits. Also, conversely, some of functions which are implemented by hardware circuits may be implemented in a software wise.

What is claimed is:

1. A parking assist device for assisting parking of a vehicle, comprising:
   a detecting unit that, on the basis of a taken image of the surrounding area of the vehicle, detects a plurality of parking areas, detects the presence of obstacles within the detected plurality of parking areas, and detects available parking areas for the vehicle among the detected plurality of parking areas, wherein the available parking areas are those detected parking areas detected to have no obstacles; and
   a selecting unit that selects an available parking area from the detected available parking areas where the vehicle may be parked with low risk of contact with any detected obstacle.

2. The parking assist device according to claim 1, wherein:
   in a case where three or more consecutive parking areas are detected as available parking areas, the selecting unit selects an available parking area other than outermost areas.

3. The parking assist device according to claim 1, wherein:
   in a case where two consecutive parking areas are detected as available parking areas, the selecting unit selects an available parking area according to the distances between the detected available parking areas and the obstacle.

4. The parking assist device according to claim 3, wherein:
   the selecting unit selects an available parking area having a longer distance from the obstacle, from the detected two available parking areas.

5. The parking assist device according to claim 1, wherein:
   in a case where two consecutive parking areas are detected as available parking areas, the selecting unit selects an available parking area according to the passenger location condition of the vehicle.

6. The parking assist device according to claim 1, wherein:
   the selecting unit selects an available parking area according to whether there is any obstacle in an area positioned on the front side of each of the detected available parking areas.

7. The parking assist device according to claim 1, wherein:
   for evaluation items which are surrounding conditions of the vehicle, evaluation values representing degrees of parking appropriateness are set in advance, and
   the selecting unit derives the degree of parking appropriateness on the basis of evaluation values associated with evaluation items corresponding to each of the available parking areas, and selects an available parking area where the vehicle is parked with low risk of contact with the obstacle, on the basis of the degrees of parking appropriateness.

8. The parking assist device according to claim 1, wherein:
   for evaluation items which are obstacle conditions, evaluation values representing the degrees of parking appropriateness are set in advance, and
   the selecting unit derives the degree of parking appropriateness on the basis of evaluation values associated with evaluation items corresponding to each of the available parking areas, and selects an available parking area appropriate for parking the vehicle, on the basis of the degrees of parking appropriateness.

9. The parking assist device according to claim 7, wherein:
   the evaluation values are set depending on the passenger location condition of the vehicle.

10. The parking assist device according to claim 1, further comprising:
    a route deriving unit that derives movement routes to the detected available parking areas; and
    a display control unit that displays and superimposes the derived movement routes on the taken image.

11. The parking assist device according to claim 10, wherein:
    the display control unit displays and superimposes a movement route to an available parking area for parking the vehicle on the taken image, and does not display and superimpose movement routes to the other available parking areas.

12. A parking assist system for assisting parking of a vehicle, comprising:
    an imaging device that images the surrounding area of the vehicle; and
    the parking assist device according to claim 1.

* * * * *